(12) United States Patent
Hill et al.

(10) Patent No.: US 7,693,821 B2
(45) Date of Patent: Apr. 6, 2010

(54) VIRTUAL PAIR ALGORITHM FOR OUTER JOIN RESOLUTION

(75) Inventors: Gerhard L. Hill, St. Leon (DE); Thomas Peh, Heidelberg (DE); Jane Hartmann, Frankenthal (DE)

(73) Assignee: SAP AG, Walldorf (DE)

( * ) Notice: Subject to any disclaimer, the term of this patent is extended or adjusted under 35 U.S.C. 154(b) by 274 days.

(21) Appl. No.: 11/494,042

(22) Filed: Jul. 27, 2006

(65) Prior Publication Data
US 2008/0027903 A1 Jan. 31, 2008

(51) Int. Cl.
*G06F 17/00* (2006.01)
(52) U.S. Cl. ................. 707/2; 707/3; 707/4
(58) Field of Classification Search ........ 707/2–4
See application file for complete search history.

(56) References Cited

U.S. PATENT DOCUMENTS

| | | | | |
|---|---|---|---|---|
| 6,125,360 | A * | 9/2000 | Witkowski et al. | 707/2 |
| 6,134,534 | A * | 10/2000 | Walker et al. | 705/26 |
| 6,496,819 | B1 | 12/2002 | Bello et al. | |
| 6,834,279 | B1 * | 12/2004 | Chiang | 707/2 |
| 2005/0050030 | A1 * | 3/2005 | Gudbjartsson et al. | 707/3 |
| 2006/0085592 | A1 * | 4/2006 | Ganguly et al. | 711/114 |
| 2006/0282424 | A1 * | 12/2006 | Larson et al. | 707/4 |

OTHER PUBLICATIONS

Sam et al. "Virtual -Join: a Query execution technique", Department of Computer Science national University of Singapore, Copyright 2002 IEEE.*
Morrissey et al. "Combining Semijoins and hash-semijoins in a distributed query processing strategy", copyrigh 1999 IEEE.*
Chen et al. "Determining Beneficial Semijoins for a Join Sequence in Distributed query processing". IBM Thomas J. Watson Research Center, Copyright 1991 IEEE.*
Weihrauch, Maryela., "DB2 for OS/390 V5 vs. V6 outer join performance", IEEE International Symposium on Performance Analysis of Systems and Software, pp. 46-51 (2000).
David, Michael M., "Advanced Capabilities of the Outer Join", SIGMOD Record, vol. 21, No. 1, pp. 65-70 (1992).

* cited by examiner

*Primary Examiner*—Apu M Mofiz
*Assistant Examiner*—Cindy Nguyen
(74) *Attorney, Agent, or Firm*—Mintz, Levin, Cohn, Ferris, Glovsky and Popeo, P.C.

(57) ABSTRACT

A system and method for executing semijoin reductions on outer join operations are presented. Tuple lists are created based on a query. A sequence of semijoin reduction steps are performed, where each semijoin reduction step either switches one tuple list, or reduces all tuple lists at one relation. Virtual connector pairs are inserted into the tuple lists, and then all tuple lists are centralized at a common host. The join results are assembled at the common host, and negative row IDs are substituted. From the join result, the query result is retrieved by projecting to the requested attributes.

21 Claims, 2 Drawing Sheets

VIRTUAL PAIR ALGORITHM FOR OUTER JOIN RESOLUTION

BACKGROUND

This disclosure relates generally to computer-based mechanisms for performing join operations, and more particularly to techniques for using semijoin reduction operations to resolve outer join queries.

In relational databases, a relation represents a set of entities such as customers or products as an association between properties of the entities called attributes. An element of a relation is an ordered set of associated properties called a tuple. A relational database contains tables of data, and each table implements a relation. Each row in the table represents a tuple in the relation. Each column represents a value range of an attribute, such that each cell in the column contains a value, which may be a repeated value or a null value.

A central task in enterprise data processing is to extract from a relational database the set of tuples that meet some given logical condition. Often, the task is to extract tuples that each contain values from more than one table in the database. A table for relation A can include a column for the same attribute as another table for relation B. In such cases, the tables A and B can be joined logically by matching rows via the values of this attribute. To extract a specified set of tuples that include properties from several tables, the respective tables need to be joined.

Search and classification systems, such as the SAP NetWeaver Text Retrieval and Extraction (TREX) system, perform many tasks, including extraction of tuples that meet given logical conditions. In such cases, the task is called a search request or a database query, and the set of tuples that meet the logical condition specified in the query is called the result set. In order to perform such tasks with the required efficiency, a system like TREX uses highly optimized techniques for joining tables. One such technique is described in more detail below.

In many cases, join operations are computationally expensive. For this reason, much research has been devoted to devising efficient algorithms for resolving them. For example, techniques for performing a hash join, a sort merge join, a join via semijoin, and nested loop join are well known to those of skill in the art. Some systems such as TREX may evaluate joins via semijoins, particularly if every relation is located on a different host. An exemplary semijoin technique can be executed as follows.

For a single join J of the form A.x=B.y, the relation A is reduced by J as follows: At B, a list L of all occurring values b.y. is constructed, L is sent to A over a communication line from the host of B to the host of A, and all rows a whose value a.x is not in L are deleted from A. This is called a semijoin reduction step.

Semijoin reduction steps are performed until the relations are no longer further reduced (or until none of the possible semijoin reduction steps is still considered "profitable" by a cost measure that is different from relation size). After the reduction phase, for all attributes A.x occurring in the join the tuple lists T(A,x), which consist of the pairs (a,a.x) where a is the row identifier of a non-removed row of A and a.x, the value of the attribute A.x, is sent to a common host where the result of the join is assembled.

One tool for working with complex joins is called a query graph. The query graph is obtained from the query by drawing a vertex for every relation in the join and an edge between any two vertices joined by a join condition. In the assembly process, it may be assumed that the query graph is connected, since the solution of the whole query is simply the Cartesian product of the solutions of its connected components, which themselves are query graphs. The assembly process then works as follows.

The vertices of the query graph are ordered into a sequence $A_1, A_2, \ldots, A_n$, such that for every $i>1$, relation $A_i$ is joined to at least one relation $A_j$ with $j<i$. Iteration is started on $A_1$. For $a_1 \in A_1$, a 1-tuple $(a_1)$ is formed. Assuming, in general, that the construction of 1-tuples, 2-tuples, ..., i-tuples for some i with $1<=i<n$ has been defined, construction of (i+1)-tuples can proceed as follows.

Let $B_1, B_2, \ldots, B_k$ be those relations among $A_1, A_2, \ldots, A_i$ with which $A(i+1)$ is joined, $k>=1$ holds by vertex ordering. If the query graph is a tree, $k=1$ will always holds. In any case (also for $k>1$) any given i-tuple $(a_1, a_2, \ldots, a_i)$, let $b_1 \in B_1, b_2 \in B_2, \ldots, b_k \in B_k$ be the corresponding elements in this i-tuple. Assume the join between $B_j$ and $A(i+1)$ to be $B_j.x_j = A(i+1).y_j$, $j=1, \ldots, k$, the sets $M_j$ of pairs in $T(A(i+1), y_j)$ satisfying $a(i+1).y_j = b_j.x_j$ can be found, and their intersection D can then be formed. If D is empty, consider the next tuple $(a_1', a_2', \ldots, a_h')$, for h h chosen to minimally comprise $B_1, B_2, \ldots, B_k$ (so $1<=k<=h<=i$), extend it to an i-tuple $(a_1', a_2', \ldots, a_i')$ and repeat the process. If D is not empty, iterate on D. For $a(i+1) \in D$, form an (i+1)-tuple $(a_1, a_2, \ldots, a_i, a(i+1))$.

The general assembly process can be illustrated in a simple example. Let the query graph be the three-vertex chain:

A-B-C with join conditions A.x=B.x and B.y=C.y (note the simplifying identity of attribute names in join conditions). The relation order A, B, C can be used. A common value of a.x and b.x can be represented in shorthand as x. Starting with any $a \in A$, a 1-tuple (a) exists. Next, $b \in B$ is determined such that there are pairs (a,x) and (b,x). The 1-tuple (a) can be extended to a 2-tuple (a,b). Then, $c \in C$ is determined such that there are pairs (b,y) and (c,y). The 2-tuple (a,b) can finally be extended to a 3-tuple (a,b,c).

In summary, 4 pairs (a,x), (b,x), (b,y), (c,y) of row identifiers and attribute values are used to construct the 3-tuple (a,b,c) of row identifiers. If the order in every second pair is reversed, i.e. (a,x), (x,b), (b,y), (y,c), then the domino principle becomes evident.

The technique of semijoin reduction is well suited for a distributed environment where the relations may be located on different hosts. In this case, the usual aim is to minimize communication costs, which aim is furthered in that no large intermediate joins are generated to be transmitted over a communication line, and the list L of occurring values may be (cumulatively) subject to different compression techniques. However, conventional semijoin techniques are used only for evaluating inner joins, and are not suitable for outer join resolution operations.

SUMMARY

In general, this document discusses a system and method for employing semijoin reduction techniques to outer join operations. This is achieved generally by defining virtual pairs of row identifiers and attribute values, to integrate semijoin reductions for outer join resolution.

In accordance with one aspect, the semijoin reduction technique, which is already known for inner join resolution, is extended to outer joins by modifying the semijoin reduction procedure to provide an algorithm to generate the needed connecting virtual pairs from the join specification. Connecting virtual pairs are introduced into the semijoin tuple lists, and the join tuples are constructed by a modified assembly procedure.

In accordance with another aspect, a method for executing an outer join includes performing semijoin reduction steps, each semijoin reduction step switching one tuple list or reducing all tuple lists of one relation, until a predefined criterion is met. In one embodiment, the predefined criterion can include every target relation being reduced by all the necessary relations. The method further includes adding virtual connector pairs to the tuple lists, and sending all the tuple lists to a common host for assembling the join result.

In some implementations, the predefined criterion for stopping the performing semijoin reduction steps may be changed. For example, the semijoin reduction steps may be performed so long as the reduction steps are "profitable," i.e., where profitability is defined in terms of some appropriate cost measure that need not necessarily refer to relation size. Further, in the assembly step, the virtual pairs are concatenated using a domino principle and then spliced together to obtain the resulting tuples of the join.

In a particular implementation, a method for executing an outer join in a relational database distributed across multiple hosts to process a query includes creating a tuple list for relations in the relational database and for joins referencing each relation. The method further includes performing a sequence of semijoin reduction steps on the joins, and adding virtual connector pairs to the tuple lists.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for extending the technique of semijoin reduction, which is known to apply to inner joins, to the resolution of outer join queries, as described below.

Figure 1:
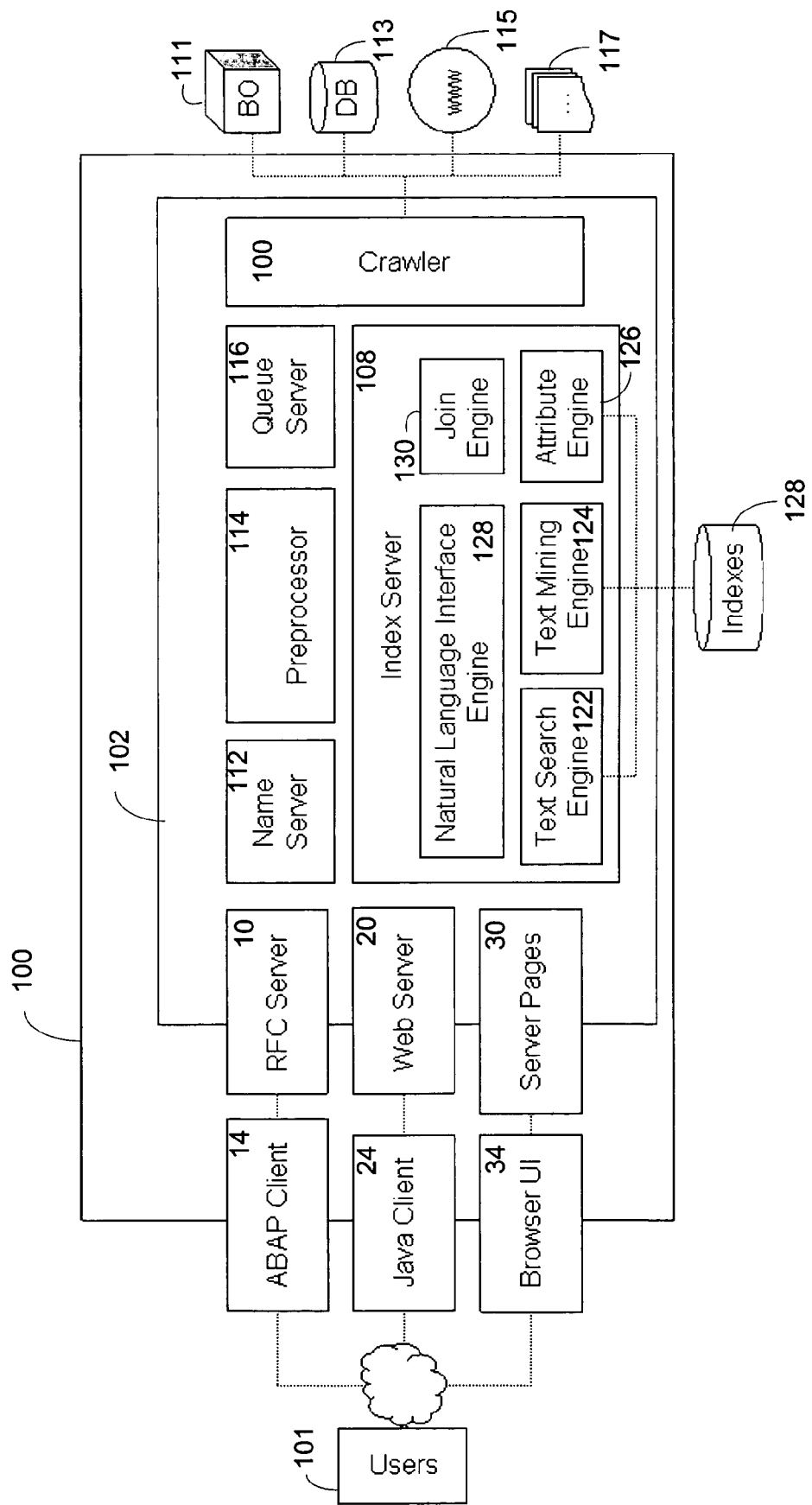
FIG. 1 is a schematic block diagram of a search and classification system on which semijoin reduction techniques can be executed.

FIG. 1 shows a communication network 100 having a search and classification system 102 upon which the technique of extending semijoin reduction to the resolution of outer join queries can be executed. The exemplary embodiment of the information retrieval service system 102 is an SAP NetWeaver TREX (Text Retrieval and Extraction) search and classification engine system, developed by SAP AG of Walldorf, Germany. With the search and classification system 102, users 101 can search in various ways, and in particular can search in a way which is relevant to this disclosure, which is to say they can enter text which is logically equivalent to a query specified in an SQL-like syntax that requests the retrieval of certain information from a store of structured information, where the store may conform to a data model.

The search and classification system 102 receives queries in one of several ways. It may receive queries from a web server 20, which in turn receives hypertext transport protocol (HTTP) requests from a client 24, such as a JAVA client program. Alternatively, queries can also be received from a Remote Function Call (RFC) server 10 via a gateway 12 from a business application client 14 implemented in the SAP Advanced Business Application Programming (ABAP) language, or from server pages via a browser user interface 34.

The system 102 includes a name server 112, a preprocessor 114, a queue server 116, and a crawler 118. The name server 112 directs the incoming queries to the appropriate engine in an index server 108. The index server 108 includes several engines configured for particular types of searches, such as a text search engine 122, a text mining engine 124, an attribute engine 126, and their associated indices 128. Requests for searches on structured data are sent to the attribute engine 126, which initiates searches over the tables representing the relevant relations. Results of the search requests are returned to the user 101 via the web client or business application client.

The crawler 118 executes cruises of various sources of structured information including, without limitation, a set of business objects 111, a database 113, a website 115 such as the internet or other URL-based networks such as a corporate intranet, and/or a document repository 117. The index server 108 includes a natural language interface engine 128 to perform intelligent text-based searching and retrieval on natural language queries.

The index server 108 of the search and classification system 102 further includes a join engine 130 for executing joins. For a join between two relations A and B on the condition A.x=B.y, the following standard notation is used:

Inner join: A-B. The inner join consists of all pairs (a,b) with a ∈ A, b ∈ B such that a.x=b.y. The inner join is commutative: A-B equals B-A up to position swap.

Left outer join: A→B. The left outer join consists of the inner join plus the left exception join. These are the pairs (a,−) for those a ∈ A such that no b ∈ B satisfies a.x=b.y. It is used if the content of A needs to be preserved by the join. Every a ∈ A occurs as a first component either in the inner join or in the left exception join. Left outer joins in general are not commutative.

Right outer join: A←B. The right outer join consists of the inner join plus the right exception join. These are the pairs (−,b) for those b ∈ B such that no a ∈ A satisfies a.x=b.y. The content of B is preserved. The right outer join A←B equals the left outer join B→A up to position swap.

Full outer join: A←→B. The full outer join consists of the inner join plus the left exception join plus the right exception join. It is the set union of A→B and A←B. Full outer join is commutative: A←→B equals B←→A up to position swap.

To illustrate one preferred technique, refer to the following example of an outer join query:

$$Q: (A \xrightarrow{x} B) \xleftarrow{y} (C \xrightarrow{z} D)$$

For simplicity, the shared attribute name is used for each pair of joined relations and written over the relevant joins. For example, the first join in Q is a left outer join on the condition A.x=B.x.

When an outer join query is formulated, there is immediately a lack of two important properties that are present for inner joins, namely commutativity (as described above) and associativity. Associativity means essentially that brackets specifying an execution order for the joins are not needed, because the result is the same for any execution order. For example, we could also consider the following outer join query consisting of the same joins executed in a different order: First z, then y, and last x.

$$Q': A \xrightarrow{x} (B \xleftarrow{y} (C \xrightarrow{z} D))$$

The solution set for Q can be computed to consist exactly of the following 6 tuple forms (see the end of this disclosure):
(a,b,c,d)—this is the inner join part
(a,b,c,−)
(a,b,−,−)
(a,−,−,−)
(−,−,c,d)
(−,−,c,−)

Since Q' is a left outer join, every satisfying quadruple has a non-null A-entry, and thus Q is not equivalent to Q'. Also, there is still some freedom regarding the execution order. Either of the joins x or z can be executed first, while y must be executed last.

In a preferred exemplary embodiment, a procedure begins by giving "names" to the arrowheads appearing in the join. Although, in principle, the naming scheme is immaterial, writing down the elementary joins in the order of their execution and "naming" the arrowheads with consecutive negative integers is convenient, as illustrated as follows:

$$A \xrightarrow{x} B \text{ for B.x: -1}$$
$$C \xrightarrow{z} D \text{ for D.z: -2}$$
$$B \xleftarrow{y} C \text{ for B.y: -3, for C.y: -4}$$

The same tuple lists as in the inner join case will exist:
At A: T(A,x)
At B: T(B,x) and T(B,y)
At C: T(C,y) and T(C,z)
At D: T(D,z)

However, their meaning is partly modified. First, the semi-join reduction is given a different meaning in the outer join case (see below) than in the inner join case. As a consequence, these tuple lists must now be used already in the reduction phase, not only after it. Second, the tuple lists contain virtual pairs. Virtual pairs are characterized by a negative second component, for example (a,x=−1). The traditional pairs (a,a.x), where always a.x>=0, are also referred to as real pairs.

The reduction process will now be explained step by step. Initially, the following full sets are presented:
T(A,x)={(a,a.x): a ∈ A}
. . .
T(D,z)={(d,d.z): d ∈ D}

Consider any join R.v=S.v. During the reduction process there are two cases of possible reduction behavior when a list L of v-values of S arrives at the tuple list T(R,v):

Case 1: There is no arrowhead at S. That is, v is either an inner join $$R \xrightarrow{v} S$$

or a right outer join $$R \xleftarrow{v} S$$

In this case, all tuple lists at R are reduced. For every real pair (r,r.v), whose attribute value r.v is not present in L, all pairs having first component r are removed from all tuple lists at R. For any fixed r ∈ R there is at most one pair (r, . . . ) in T(R,v).

Case 2: There is an arrowhead at S. That is, v is either a left outer join $$R \xrightarrow{v} S$$

or a full outer join $$R \xleftarrow{v} S.$$

In this case, the tuple list T(R,v) is switched. Every real pair (r,r.v), whose attribute value r.v is not present in L, is switched to a virtual pair with the same row identifier r, such as (r,v=−1).

In the above example of outer join query Q, there are two tuple lists having the first behavior: that is, upon reduction, all tuple lists at the same relation are reduced. These are T(B,x) and T(D,z). There are four tuple lists having the second behavior: that is, upon reduction, only themselves are switched. These are T(A,x), T(B,y), T(C,y), T(C,z). As a consequence, all tuple lists on the same relation contain the same row identifiers at any time in the reduction procedure.

The second step is to determine, for any given tuple list, which relations exert an influence on it. This is an easy topological calculation performed on the query graph. The result in the example query Q is:
T(A,x) is influenced by B
T(B,x) is influenced by A
T(B,y) is influenced by A, C
T(C,y) is influenced by A, B
T(C,z) is influenced by D
T(D,z) is influenced by C The third step is to choose a sequence of semijoin reduction steps. Whereas in the classical inner join case a relation is reduced by a join, in outer joins it is tuple lists that are reduced, and the reducing partner is left implicit. Reduction sequences are independent of the execution order of the joins (i.e. the parentheses in Q). For our example, one possible choice is:
reduce T(A,x),
reduce T(B,x),
reduce T(C,y),
reduce T(D,z),
reduce T(C,z),
reduce T(B,y).

Note that this sequence would not be satisfactory if all joins in Q were inner joins, because T(A,x) does not get reduced by C or D. For Q this is acceptable, since T(A,x) is not influenced by C or D. After the reduction phase, the tuple lists will contain pairs of the following forms:
T(A,x): (a,a.x), (a,x=−1)
T(B,x): (b,b.x)

T(B,y): (b,b.y), (b,y=−4)
T(C,y): (c,c.y), (c,y=−3)
T(C,z): (c,c.z), (c,z=−2)
T(D,z): (d,d.z)

In preferred embodiments, a few special pairs, called connector pairs, are added. The connector pairs are always virtual, and only serve to let the correct tuples of the total join be created. Connector pairs themselves are invisible in the result: after a join tuple has been created, all negative row identifiers are substituted by null values, written as "−". Connector pairs are a condensed reflection of the missing associativity in composing outer joins. By using them, the rest of the join resolution procedure is indifferent to nonassociativity.

To determine the necessary connector pairs, all joins are considered in the order of their execution, that is, all arrowheads are considered in the sequence of the numbering chosen. Accordingly, at every intermediate step, the correct tuples on the relations of the partial join can be created.

To illustrate, begin with the left outer join x. The relations involved are A and B. In order to produce the tuples of the left outer join $$A \xrightarrow{x} B,$$

only the virtual pair (b=−1,x=−1) at T(B,x) is needed in order to connect the pairs (a,x=−1) at T(A,x) to it. Thus, the current content of the tuple lists are:
T(A,x): (a,a.x), (a,x=−1)
T(B,x): (b,b.x), (b=−1,x=−1)
T(B,y): (b,b.y), (b,y=−4)
T(C,y): (c,c.y), (c,y=−3)
T(C,z): (c,c.z), (c,z=−2)
T(D,z): (d,d.z)

Producible tuples on A and B include (a,b) and (a,−), the latter from (a,b=−1) by substituting a null value for the −1. The process continues with the left outer join z. The relations involved are C and D. The situation is the same as with x: the virtual pair (d=−2,z=−2) only needs to be inserted at T(D,z). Now, the current content of the tuple lists are:
T(A,x): (a,a.x), (a,x=−1)
T(B,x): (b,b.x), (b=−1,x=−1)
T(B,y): (b,b.y), (b,y=−4)
T(C,y): (c,c.y), (c,y=−3)
T(C,z): (c,c.z), (c,z=−2)
T(D,z): (d,d.z), (d=−2,z=−2)

Producible tuples on A and B include (a,b) and (a,−). Producible tuples on C and D include (c,d) and (c,−), the latter from (c,d=−2) by substituting a null value for the virtual component −2.

An interesting case is the full outer join y. As $$A \xrightarrow{x} B \text{ and } C \xrightarrow{z} D$$

are joined, all four relations A, B, C and D are now involved. The join y's two arrowheads are processed separately.

Consider the arrowhead of y at B: it has the "name" −3. Every tuple producible on the subgraph H of the query graph which is before −3 should be preserved. Here, H={C, D} and the producible tuples—before substitution—have the forms (c,d) and (c,d=−2). To achieve this, it must be ascertained that 1) all pairs of T(C,z) connect to T(C,y), and 2) all pairs from T(C,y) connect to the whole subgraph T of the query graph which is behind −3. Here, T={A, B}. Statement 1 is obviously satisfied, but statement 2 is not yet true. To make it true, the pairs (b=−3,y=−3) are inserted into T(B,y), (b=−3,x=−3) are inserted into T(B,x), and (a=−3,x=−3) are inserted into T(A, x). The current content of the tuple lists now are:
T(A,x): (a,a.x), (a,x=−1), (a=−3,x=−3)
T(B,x): (b,b.x), (b=−1,x=−1), (b=−3,x=−3)
T(B,y): (b,b.y), (b,y=−4), (b=−3,y=−3)
T(C,y): (c,c.y), (c,y=−3)
T(C,z): (c,c.z), (c,z=−2)
T(D,z): (d,d.z), (d=−2,z=−2)

Finally, the arrowhead of y at C with the "name" −4 is considered. Here, every tuple producible on the subgraph H of the query graph which is before −4 should be preserved. We have H={A, B} and the producible tuples have the forms (a,b) and (a,b=−1). It must be ascertained that: 1) all pairs of T(B,x) connect to T(B,y), and 2) all pairs from T(B,y) connect to the whole subgraph T of the query graph which is behind −4. Here T={C, D}. The current content of the tuple lists now are:
T(A,x): (a,a.x), (a,x=−1), (a=−3,x=−3)
T(B,x): (b,b.x), (b=−1,x=−1), (b=−3,x=−3)
T(B,y): (b,b.y), (b,y=−4), (b=−3,y=−3)
T(C,y): (c,c.y), (c,y=−3)
T(C,z): (c,c.z), (c,z=−2)
T(D,z): (d,d.z), (d=−2,z=−2)

Since (b=−1,x=−1) does not connect to T(B,y), condition 1) is not yet satisfied. This is remedied by introducing (b=−1,y=−4) into T(B,y). The current content of the tuple lists are:
T(A,x): (a,a.x), (a,x=−1), (a=−3,x=−3)
T(B,x): (b,b.x), (b=−1,x=−1), (b=−3,x=−3)
T(B,y): (b,b.y), (b,y=−4), (b=−3,y=−3), (b=−1,y=−4)
T(C,y): (c,c.y), (c,y=−3)
T(C,z): (c,c.z), (c,z=−2)
T(D,z): (d,d.z), (d=−2,z=−2)

To also satisfy condition 2), which is essentially a propagation issue, (c=−4,y=−4) is inserted into T(C,y), (c=−4,z=−4) is inserted into T(C,z), and (d=−4,z=−4) is inserted into T(D,z). The final content of the tuple lists are:
T(A,x): (a,a.x), (a,x=−1), (a=−3,x=−3)
T(B,x): (b,b.x), (b=−1,x=−1), (b=−3,x=−3)
T(B,y): (b,b.y), (b,y=−4), (b=−3,y=−3), (b=−1,y=−4)
T(C,y): (c,c.y), (c,y=−3), (c=−4,y=−4)
T(C,z): (c,c.z), (c,z=−2), (c=−4,z=−4)
T(D,z): (d,d.z), (d=−2,z=−2), (d=−4,z=−4)

From the meaning of a full outer join, the tuple forms that are producible on A, B, C, and D should be exactly as follows:
From inner joining (a,b), (a,−) and (c,d), (c,−): (a,b,c,d) and (a,b,c,−).
From preserving (a,b) and (a,−): (a,b,−,−) and (a,−,−,−).
From preserving (c,d) and (c,−): (−,−,c,d) and (−,−,c,−).

After inserting just these few connecting virtual pairs, the tuples satisfying the total join can now be assembled using the domino principle in the same manner as the classical inner join case, if only, upon completion, every negative integer is substituted by a null value. This is demonstrated in our chosen example query Q by showing half of the claim above: that the tuple forms mentioned above can indeed be produced. (For brevity, x is substituted for the common value of a.x and b.x.)

1) Tuple form (a,b,c,d): use pairs (a,x), (b,x), (b,y), (c,y), (c,z), (d,z), reverse the order of every second pair for domino order: (a,x), (x,b), (b,y), (y,c), (c,z), (z,d) and compose to (a,b,c,d).

2) Tuple form (a,b,c,−): use pairs (a,x), (b,x), (b,y), (c,y), (c,z=−2), (d=−2,z=−2), reverse order to (a,x), (x,b), (b,y), (y,c), (c,z=−2), (z=−2,d=−2), compose to (a,b,c,d=−2) and substitute to (a,b,c,−).

3) Tuple form (a,b,-,-): use pairs (a,x), (b,x), (b,y=4), (c=-4,y=-4), (c=-4,z=4), (d=-4,z=-4), reverse order to (a,x), (x,b), (b,y=-4), (y=-4,c=-4), (c=-4,z=-4), (z=-4,d=-4), compose to (a,b,c=-4,d=-4) and substitute to (a,b,-,-).

4) Tuple form (a,-,-,-): use pairs (a,x=-1), (b=-1,x=-1), (b=-1,y=-4), (c="4,y=-4), (c=-4,z=-4), (d=-4,z=-4), reverse order to (a,x=-1), (x=-1,b=-1), (b=-1,y=-4), (y=-4,c=-4), (c=-4,z=-4), (z=-4,d=-4), compose to (a,b=-1, c=-4,d=-4) and substitute to (a,-,-,-).

5) Tuple form (-,-,c,d): use pairs (a=-3,x=-3), (b=-3,x=-3), (b=-3,y=-3), (c,y=-3), (c,z), (d,z), reverse order to (a=-3,x=-3), (x=-3,b=-3), (b=-3,y=-3), (y=-3,c), (c,z), (z,d), compose to (-3,-3,c,d), substitute to (-,-,c,d).

6) Tuple form (-,-,c,-): use pairs (a=-3,x=-3), (b=-3,x=-3), (b=-3,y=-3), (c,y=-3), (c,z=-2), (d=-2,z=-2), reverse order to (a=-3,x=-3), (x=-3,b=-3), (b=-3,y=-3), (y=-3,c), (c,z=-2), (z=-2,d=-2), compose (-3,-3,c,-2) and substitute to (-,-,c,-).

No other tuple forms can be created.

Figure 2:
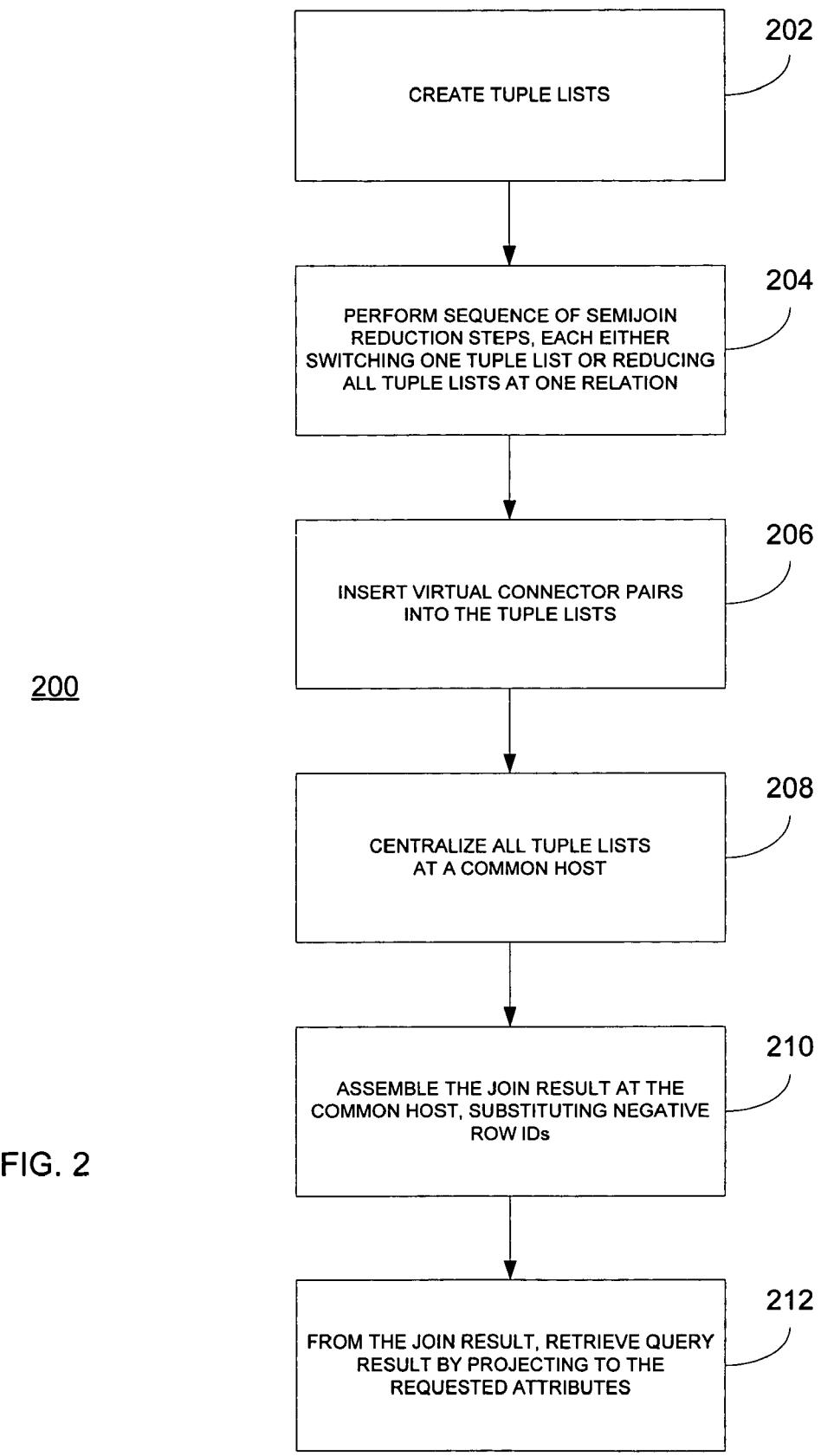
FIG. 2 is a flowchart of a method for executing semijoin reduction techniques for outer join operations.

FIG. 2 is a flowchart of a method 200 for executing semijoin reductions on outer join operations. At 202, tuple lists are created. At 204, a sequence of semijoin reduction steps are performed, as described above. Each semijoin reduction step either switches one tuple list, or reduces all tuple lists at one relation. At 206, virtual connector pairs are inserted into the tuple lists. At 208, all tuple lists are centralized at a common host. At 210, the join results are assembled at the common host, and negative row IDs are substituted as described above. At 212, from the join result, the query result is retrieved by projecting to the requested attributes.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a computer program product embodied on tangible media, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A method for executing an outer join in a relational database distributed across multiple hosts to process a query, the method comprising:
   creating by at least one computing device tuple lists for relations in the relational database and for joins referencing each relation;
   performing by the at least one computing device a sequence of semijoin reduction steps on the joins; and
   adding by the at least one computing device virtual connector pairs to one or more reduced tuple lists to connect the one or more reduced tuple lists to at least one other tuple list to enable the query to be processed, the virtual connector pairs are not visible in a result set and serve to let correct tuples to be created.

2. A method in accordance with claim 1, further comprising defining virtual pairs of row identifiers and attribute values for selected tables in the relational database.

3. A method in accordance with claim 2, wherein the sequence of semijoin reduction steps include switching one tuple list of one relation.

4. A method in accordance with claim 2, wherein the sequence of semijoin reduction steps includes reducing all tuple lists of one relation.

5. A method in accordance with claim 2, further comprising sending the tuple lists to a common host.

6. A method in accordance with claim 5, further comprising assembling a join result in the common host.

7. A method in accordance with claim 6, wherein the query includes a set of requested attributes, and wherein the method further comprises retrieving a result of the query by projecting to the requested attributes from the join result.

8. A computer-implemented method comprising:
   receiving by at least one computing device a query for a relational database, the query having a set of requested attributes, and the relational database being distributed across multiple hosts;
   creating by the at least one computing device tuple lists for relations in the relational database associated with the set of requested attributes and for joins referencing each relation;
   performing by the at least one computing device a sequence of semijoin reduction steps on the joins; and
   adding by the at least one computing device virtual connector pairs to one or more reduced tuple lists to connect the one or more reduced tuple lists to at least one other tuple list to enable the query to be processed, the virtual connector pairs are not visible in a result set and serve to let correct tuples to be created.

9. A method in accordance with claim 8, further comprising defining virtual pairs of row identifiers and attribute values for selected tables in the relational database.

10. A method in accordance with claim 9, wherein the sequence of semijoin reduction steps include switching one tuple list of one relation.

11. A method in accordance with claim 10, wherein the sequence of semijoin reduction steps includes reducing all tuple lists of one relation.

12. A method in accordance with claim 10, further comprising sending the tuple lists to a common host.

13. A method in accordance with claim 12, further comprising assembling a join result in the common host.

14. A method in accordance with claim 13, further comprising retrieving a result of the query by projecting to the requested attributes from the join result.

15. A computer program product embodied on computer-readable storage media, the computer program product to cause data processing apparatus to perform operations comprising:
   receiving a query for a relational database, the query having a set of requested attributes, and the relational database being distributed across multiple hosts;
   creating tuple lists for relations in the relational database associated with the set of requested attributes and for joins referencing each relation;
   performing a sequence of semijoin reduction steps on the joins; and
   adding virtual connector pairs to one or more reduced tuple lists to connect the one or more reduced tuple lists to at least one other tuple list to enable the query to be processed, the virtual connector pairs are not visible in a result set and serve to let correct tuples to be created.

16. A computer program product in accordance with claim 15, wherein the operations further comprise defining virtual pairs of row identifiers and attribute values for selected tables in the relational database.

17. A computer program product in accordance with claim 16, wherein the sequence of semijoin reduction steps include switching one tuple list of one relation.

18. A computer program product in accordance with claim 17, wherein the sequence of semijoin reduction steps includes reducing all tuple lists of one relation.

19. A computer program product in accordance with claim 17, wherein the operations further comprise sending the tuple lists to a common host.

20. A computer program product in accordance with claim 19, wherein the operations further comprise:
   assembling a join result in the common host; and
   retrieving a result of the query by projecting to the requested attribute5 from the join result.

21. A computer-implemented method for executing semijoin reductions on outer join operations comprising:
   creating by at least one computing device a plurality of tuple lists;

performing by the at least one computing device a sequence of semijoin reduction steps, each semijoin reduction step either switching one tuple list or reducing all tuple lists at one relation;

inserting by the at least one computing device virtual connector pairs into one or more reduced tuple lists from the plurality of tuple lists to connect the one or more reduced tuple lists to at least one other tuple list, the virtual connector pairs are not visible in a result set and serve to let correct tuples to be created;

centralizing by the at least one computing device the plurality of tuple lists at a computing-based central host;

assembling, at the central host, join results having negative row IDs therein; and retrieving by the at least one computing device a query result from the join results by projecting to attributes requested in the query.

* * * * *